United States Patent [19]

Bonse et al.

[11] Patent Number: 5,507,956
[45] Date of Patent: Apr. 16, 1996

[54] ABRASION-RESISTANT CARRIER CATALYST

[75] Inventors: Dirk Bonse, Lehrte; Karl-Heinz Bretz; Helmut Derleth, both of Nienburg; Michael Sell, Peine; Michael Bischoff, Braunschweig, all of Germany

[73] Assignee: Solvay Unweltchemie GmbH, Hans-Boeckler, Germany

[21] Appl. No.: 302,764

[22] PCT Filed: Mar. 8, 1993

[86] PCT No.: PCT/EP93/00523

§ 371 Date: Dec. 19, 1994

§ 102(e) Date: Dec. 19, 1994

[87] PCT Pub. No.: WO93/17790

PCT Pub. Date: Sep. 16, 1993

[30] Foreign Application Priority Data

Mar. 13, 1992 [DE] Germany ............... 42 07 959.4
Mar. 13, 1992 [DE] Germany ............... 42 07 960.8

[51] Int. Cl.$^6$ ...................................... C02F 1/70
[52] U.S. Cl. ................ 210/757; 210/903; 423/628; 502/8; 502/325; 502/331; 502/339
[58] Field of Search ............... 210/749, 757, 210/762, 763, 903; 423/628; 502/8, 325, 331, 339, 355

[56] References Cited

U.S. PATENT DOCUMENTS

| | | | |
|---|---|---|---|
| 3,853,789 | 12/1974 | Warthen et al. | 423/628 |
| 4,222,800 | 9/1980 | Myers et al. | 60/205 |
| 4,315,839 | 2/1982 | Bouge et al. | 252/448 |
| 4,514,511 | 4/1985 | Jacques et al. | 502/8 |
| 4,990,266 | 2/1991 | Vorlop et al. | 210/748 |
| 5,266,300 | 11/1993 | Harrison | 423/628 |
| 5,384,302 | 1/1995 | Gerdes et al. | 423/628 |

FOREIGN PATENT DOCUMENTS 015801  9/1980  European Pat. Off. .

*Primary Examiner*—Peter A. Hruskoci
*Attorney, Agent, or Firm*—Evenson, McKeown, Edwards & Lenahan

[57] ABSTRACT

The description relates to an abrasion-resistant carrier catalyst for removing the nitrite and/or nitrate content of polluted water with selective nitrogen formation. The catalytically active metal component is palladium and/or rhodium or palladium and a metal from the copper group. The carrier consists of aluminum oxide in the "theta" and "kappa" modification and has either one maximum pore diameter in the 70 to 150 nm (700 to 1500 Å) range or two maxima in the 10 to 150 nm (100 to 1500 Å) range. The description also relates to a continuously operable process for the removal or reduction of the oxygen, nitrite and/or nitrate content of water by catalytic hydrogenation. The process is implemented using the novel carrier catalysts, the carriers being made of aluminum oxide of the theta and kappa modifications. Contamination of the catalyst is effectively prevented by the preferred use according to the fluidized bed process.

21 Claims, 6 Drawing Sheets

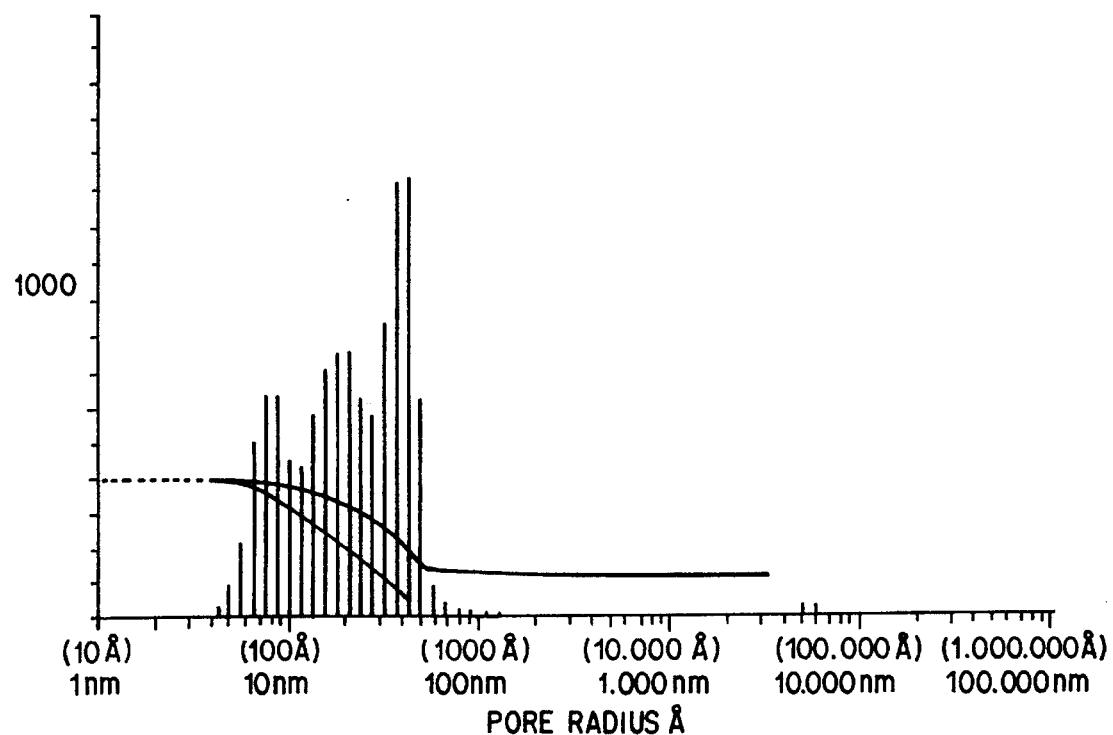
FIG. 2 (EXAMPLE 1)
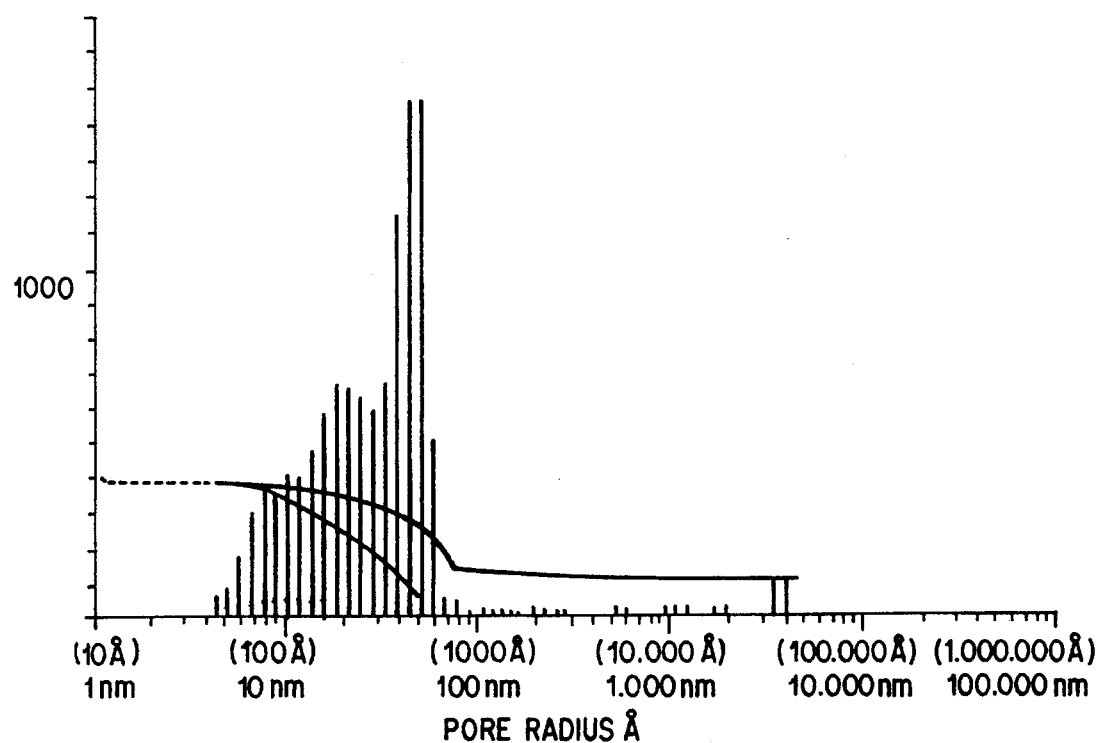
FIG. 3 (EXAMPLE 2)

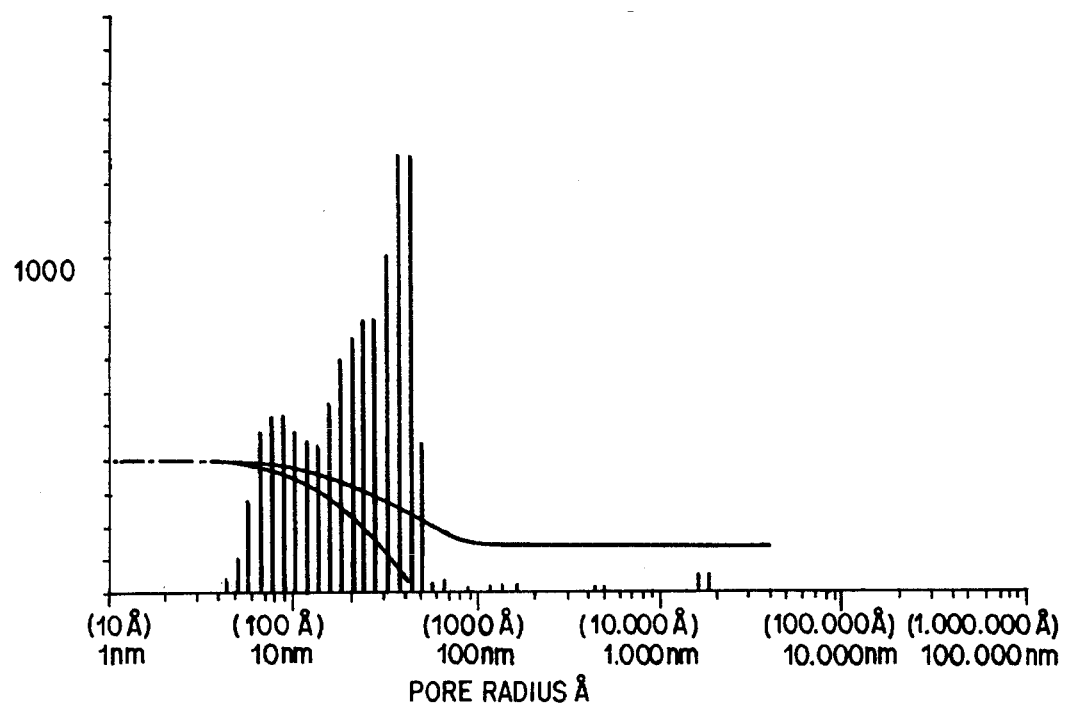
FIG. 4 (EXAMPLE 3)
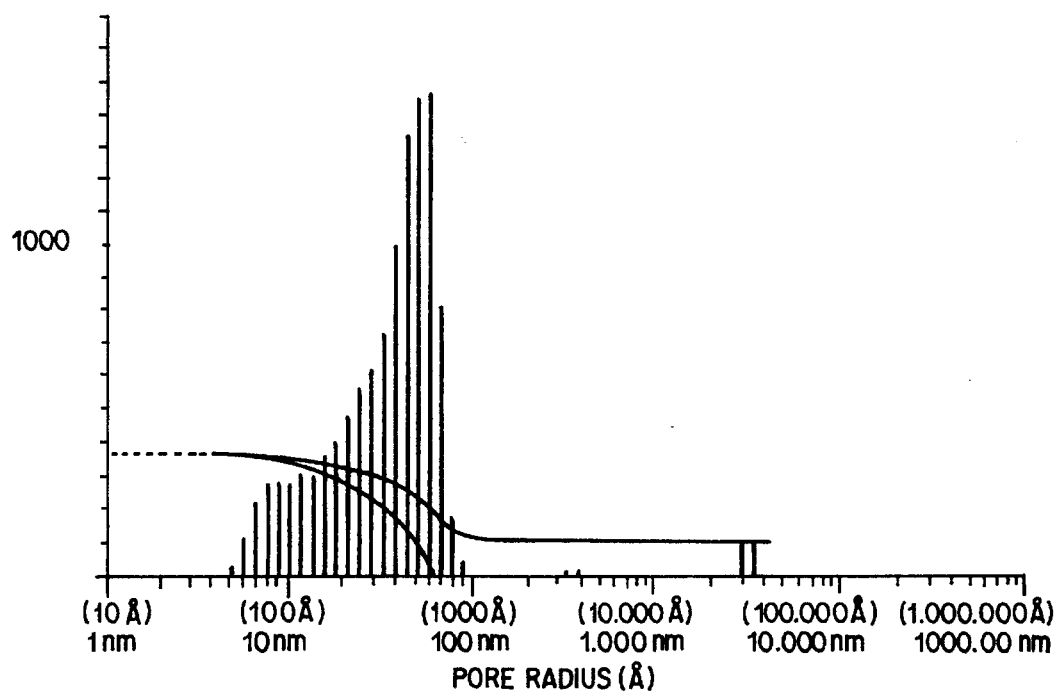
FIG. 5 (EXAMPLE 4)

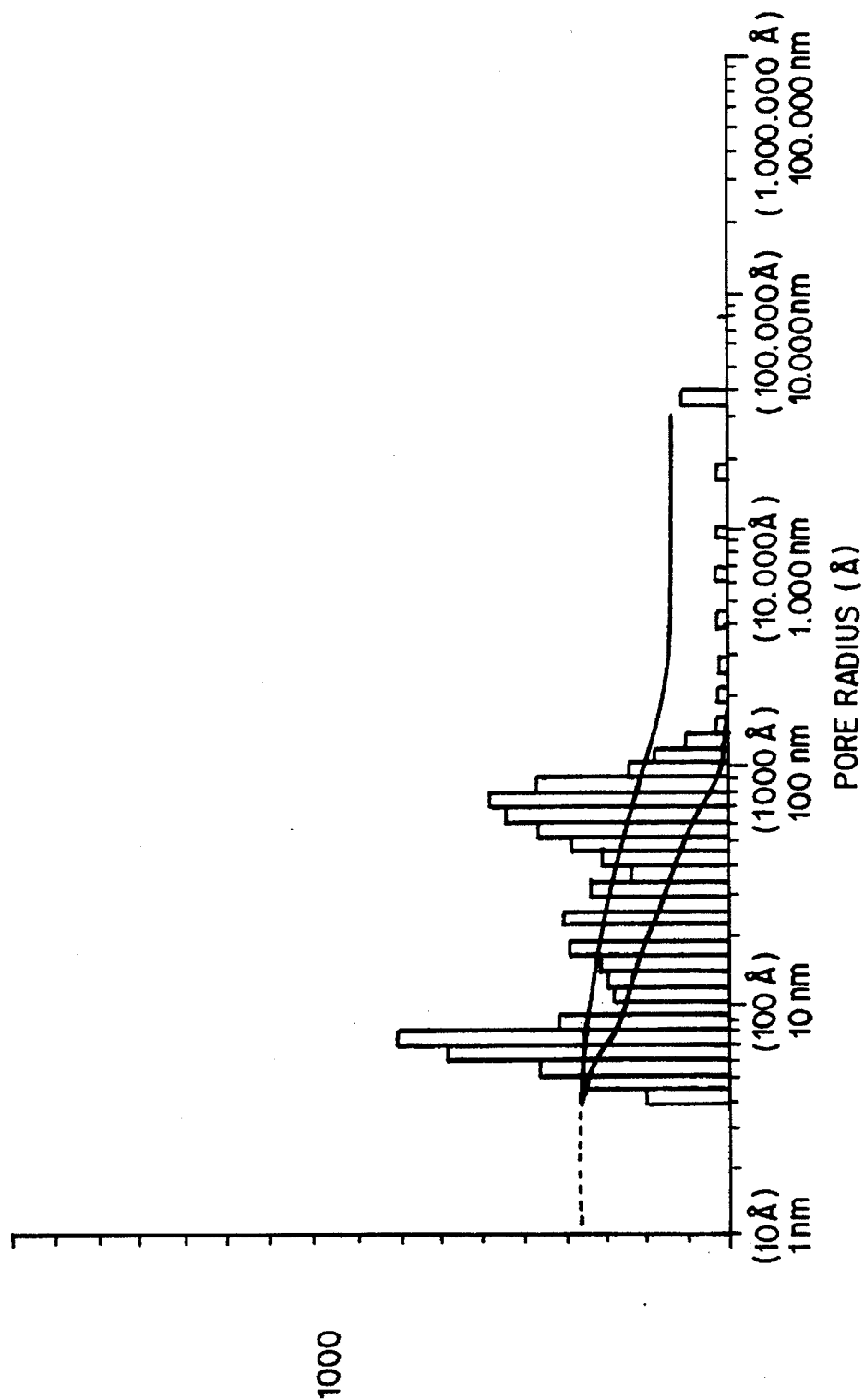
FIG. 6 (EXAMPLE 5)

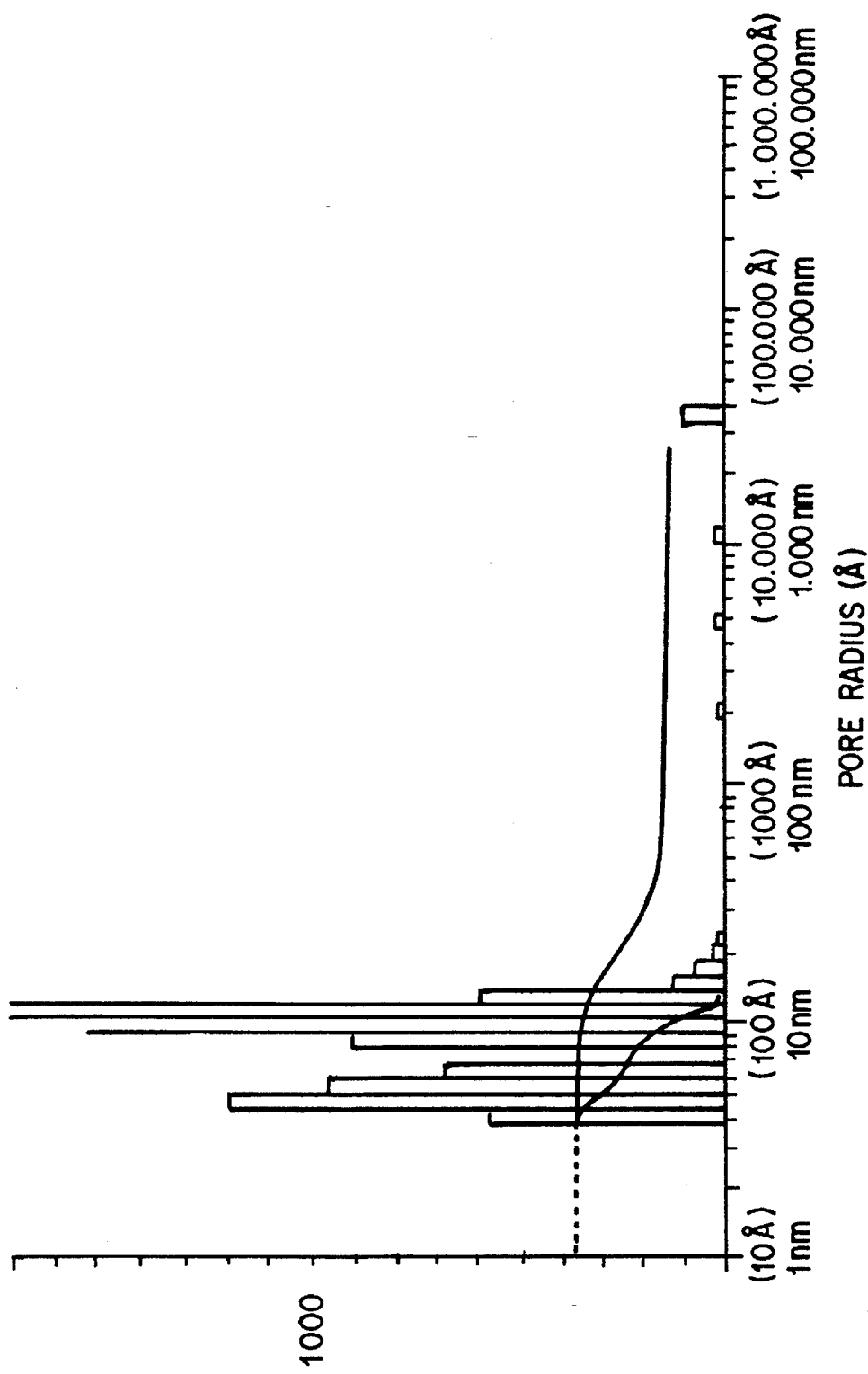

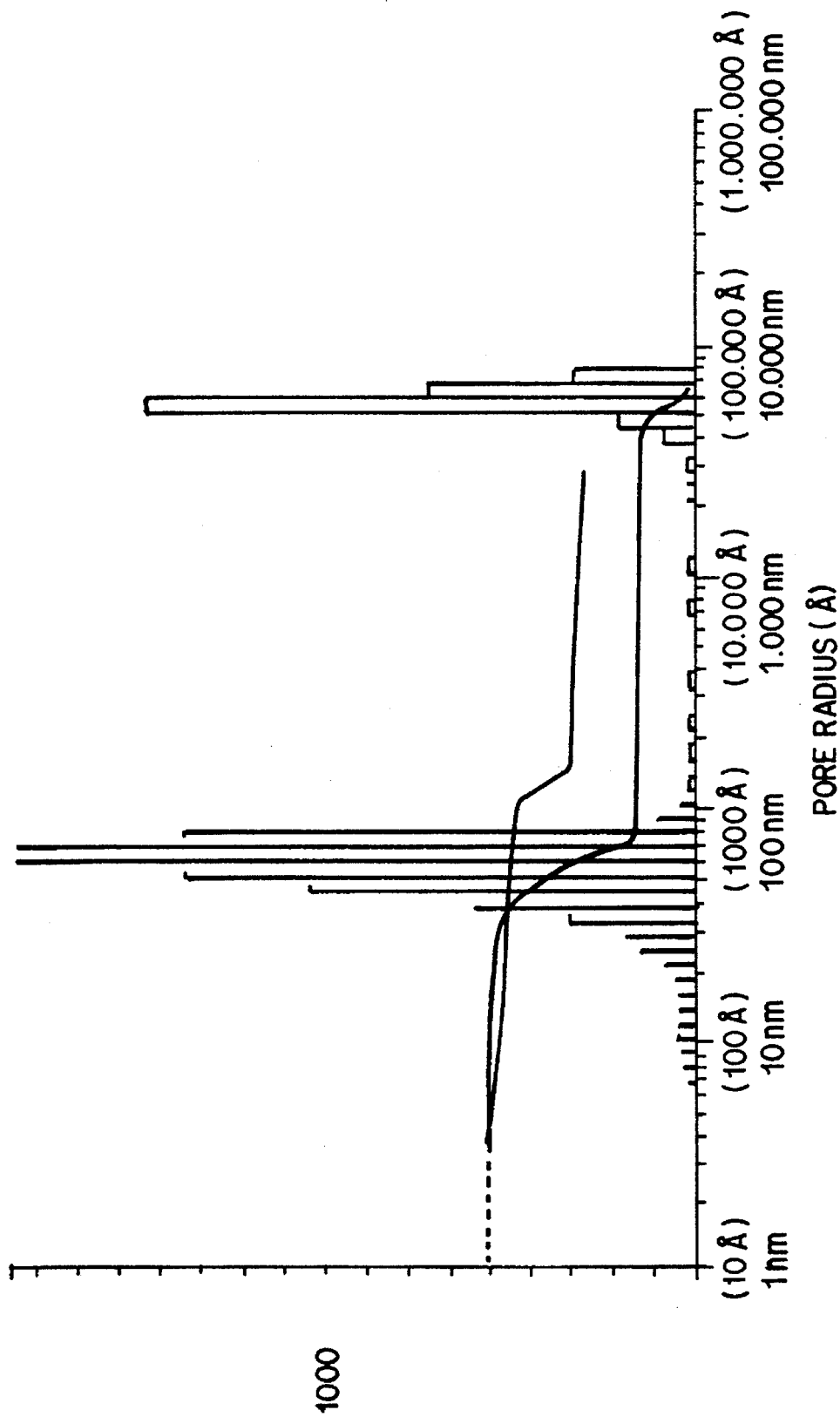
FIG. 8 (EXAMPLE 7)

ABRASION-RESISTANT CARRIER CATALYST

The invention relates to an abrasion-resistant carrier catalyst for removing nitrite and/or nitrate from correspondingly polluted water and to its use for removing the oxygen, nitrite or nitrate content in water.

In recent years, the nitrite and/or nitrate contents found in the ground water and the surface water in the Federal Republic of Germany have risen considerably. They fluctuate considerably according to the location and may partially exceed the tolerable maximum limits. In the newest guidelines of the European Community, a permissible limit value of 50 mg nitrate per liter is recommended for drinking water and a limit value of 0.1 mg/l is recommended as a limit value for nitrite. The rising nitrite and nitrate contents in many ground and surface waters increasingly require methods for the removal of nitrite and nitrate within the scope of the treatment of drinking water.

In order to remove nitrite and nitrate from drinking water, biological methods and physical/chemical measures from the realm of desalinization of water may be used. Known disadvantages of these methods are the possible contamination by bacteria or their metabolic products or the mere shifting of the problem.

The removal of oxygen from water (which may also be free of nitrite or nitrate) is desirable in many cases. Thus, it is known that oxygen in water promotes the corrosion of metallic components, such as cooling systems. In food production, for example, in the production of beverages, such as fruit juices or alcoholic beverages, a low-oxygen or oxygen-rich water is preferably used.

European Patent Document EP-A-0 359 074 (U.S. Pat. No. 4,990,266) describes a catalytically operating method for removing nitrite and/or nitrate from nitrite- and/or nitrate-laden water while selectively forming nitrogen. A carrier catalyst is used which is formed of a porous carrier impregnated by a metal component composed of palladium and/or rhodium or of palladium and a metal of the copper group. This carrier has a bimodal pore radius distribution with an at least 30% proportion, relative to the total pore volume, of macropores having a minimum radius of 200 nm (2,000) Å and/or an inhomogeneous distribution of the metal component with a concentration in the surface region, or it is present as a powder.

It is an object of the present invention to provide a particularly abrasion-resistant carrier catalyst which permits the selective conversion of nitrite and/or nitrate to nitrogen. This object is achieved by means of the carrier catalyst recited in the claims.

It is another object of the present invention to provide an improved catalytically operating process for removing oxygen, nitrite and/or nitrate from water. In particular, it is an object of the invention to develop an improved catalytic process which can be carried out under the conditions which normally exist during the treatment of water and in which the oxygen, nitrite and/or nitrate content is removed while harmless products are formed, particularly water and nitrogen, without in the process polluting the water with undesirable amounts of ammonium.

The carrier catalyst according to the invention which is suitable for the removal of the nitrite and/or nitrate content of nitrite- and/or nitrate-laden water while selectively forming nitrogen comprises a porous inorganic carrier material impregnated with a metal component and is characterized in that the carrier is composed of aluminum oxide of the "theta" and "kappa" modifications, the "alpha" modification being present in a proportion of less than 10% by weight, relative to the weight of the carrier, and the carrier being free of aluminum oxide of the "gamma" and "delta" modifications and has either one maximum (monomodal pore distribution) of the pore diameter in the range of from 70 to 150 nm (700 to 1,500 Å) or two maxima (bimodal pore distribution) of a pore diameter in the range of from 10 to 150 nm (100 to 1,500 Å), the median pore diameter being between 30 and 50 nm (300 and 500 Å).

The specific surface calculated according to the mercuryporosimetry method is preferably between 41 and 50 $m^2/g$.

The catalyst may exist in conventional catalyst shapes, as a monolith or as a bulk particulate carrier, for example, in the form of hollow spheres, cylinders, hemispheres, as an extruded part, etc. Preferably, it is present in a spherical shape. The diameter of the spheres is advantageously between 0.1 mm and 20 mm, preferably between 0.1 and 1.0 mm and particularly between 0.3 and 0.8 mm.

As the metal of the copper group, the carrier catalyst according to the invention preferably contains copper or silver, particularly copper.

The metal component preferably amounts to 0.1 to 10% by weight, particularly 0.5 and 6% by weight, and especially preferably to 0.5 and 4% by weight of the total weight of the completed catalyst.

The metal component preferably is palladium or a mixture of palladium and copper. The palladium content is preferably 0.1 to 5% by weight, particularly 0.3 to 3% by weight relative to the total weight of the completed carrier catalyst. When the metal component is composed of palladium and copper, the weight ratio of palladium to copper is preferably between 2:1 and 8:1, preferably between 3:1 and 5:1, particularly at 4:1.

The weight ratio of the "theta" to the "kappa" modification is preferably between 25:75 and 15:85.

If the carrier catalyst according to the invention has a carrier with a monomodal pore diameter distribution, the maximum of the pore diameter is preferably between 85 and 105 nm (850 and 1,050 Å).

Another object of the present invention is a catalyst system which is preferably formed from a plurality of spherical carrier catalysts according to the invention. This catalyst system comprises carrier catalysts according to the invention which are impregnated only with palladium as well as carrier catalysts according to the invention which are impregnated with palladium and a metal of the copper group, particularly copper. The various carrier catalysts may be present in the system as a mixture or separately from one another.

In the following, the production of the carrier catalyst according to the invention will be described. The production of the carrier catalyst according to the invention is characterized n that amorphous aluminum oxide ("chi" modification) and aluminum oxide hydrate, with the exception of beta aluminum monohydrate, are mixed with one another at a weight ratio of 33.69:20.50 to 44.21:7.17, optionally with the addition of water, are brought into the desired shape, are calcined for 4.5 to 6.5 hours at a temperature of from 1,045° to 1,055° C., are impregnated with the metal component and are calcined.

It is a fact that the maximum of the pore diameters and the average pore diameter are shifted toward higher values the higher the calcining temperature and the longer the calcining. The BET surface decreases the higher the calcining temperature and the longer the duration of the calcining.

The amorphous aluminum oxide used as the starting material is advantageously in a finely divided form; for example, in the form of particles of a diameter of less than 1 micrometer. As described in the European Patent Document EP-A-0 176 476, it may be produced by the flash drying of fine-grained aluminum hydroxide. Its water content is between 3 and 8% by weight. Amorphous aluminum oxide with the trade name HLS™ of the firm Martinswerk GmbH, Bergheim, was found to be particularly suitable. This is a rehydratable amorphous aluminum oxide with an aluminum oxide content of 96%. The content of sodium oxide is between 0.2 and 0.35%; the water content is approximately 4%. It has very fine particles; 99% of the particles have a diameter of less than 1 micrometer. The specific surface amounts to approximately 200 $m^2/g$.

The other aluminum oxide starting material, preferably alpha aluminum oxide monohydrate (boehmite, pseudoboehmite) is advantageously present in the form of particles of a diameter of less than 100 micrometers. The commercial products PURAL® and PURAL SB® of the firm Condea Chemie, Brunsbuettel, as well as the commercial product CATAPAL B® of the firm Vista Chemical Company, were found to be particularly suitable. PURAL NF® is a boehmite (alpha aluminum monohydrate) with 70% aluminum oxide and maximally 0.005% sodium oxide. After a three-hour activation at 550° C. the specific surface amounts to at least 160 $m^2/g$. At least 99% of the particles have a diameter smaller than 100 nicrometers. The commercial product PURAL SB® typically consists of 75% aluminum oxide, and the sodium oxide content is typically maximally 0.002%. PURAL SB® is also a boehmite; after a three-hour activation at 550° C., its surface typically amounts to 250 $m^2/g$. At least 90% of the particles have a particle size of less than 90 micrometers. The commercial product CATAPAL B® consists of small boehmite crystallites which are often called pseudoboehmite. It typically is composed of 70.7% aluminum oxide; the sodium oxide content typically amounts to 0.004% by weight, the surface to 273 $m^2/g$. CATAPAL B® is particularly suitable for the manufacture of catalyst carriers having a bimodal pore structure.

According to a preferred variant of the carrier, the "theta" and "kappa" modifications are present at a weight ratio of 30:70 to 10:90. In order to produce such a carrier, amorphous aluminum oxide and aluminum oxide hydrate are mixed at a weight ratio of from 37.90:15.17 to 42.11:9.83.

As far as the shape of the catalyst carrier is concerned, the starting material can be brought into any shape into which ceramic carrier material is normally shaped. Thus, it may be shaped to a monolithic carrier. It may also be made into bulk particulate material shapes, such as in the shape of cylinders, extruded pieces, cubes, hemispheres, hollow spheres and other shapes. Preferably, it is made into a spherical shape. This expediently takes place according to the "build-up granulation" method. This method is described in the publication by W. Peach in *Aufbereitungstechnik* (Processing Technology) 4 (1966), Pages 177 to 191 as well as in European Patent Document EP-A-0 176 476 (U.S. Pat. No. 4,637,908).

First, a mixture of amorphous aluminum oxide and aluminum hydrate, preferably alpha aluminum monohydrate, is produced, and the mixture is subjected to a build-up granulation on a rotary table with the addition of water. It is advantageous to add undersize particles and/or crushed oversize particles from an earlier build-up granulation as nucleation agents. The spherical aluminum oxide produced by build-up granulation will then advantageously be aged by being allowed to stand, and the desired fraction will be sieved out. The undersize particles and, after a corresponding crushing, the oversize particles, as mentioned above, may be returned as nucleation agents into the granulation. The product obtained by the build-up granulation will then be dried and will be calcined, as described above, and converted to the catalyst carrier material according to the invention.

The calcining time and calcining temperature parameters which are important to achieve the desired characteristics may vary slightly depending on the respective starting material used. If desired, the ideal process parameters may be determined by several preliminary tests. For example, if the temperature is raised, the proportion of "theta" and "kappa" modification is increased at the expense of possible proportions of "delta" or "gamma" modifications. If the proportion of "alpha" modification is too large, the calcining temperature will be lowered. In order to displace the pore maximum or maxima and the median pore diameter toward higher values, the calcining temperature may be increased or the calcining duration may be extended. In the opposite case, the calcining temperature is decreased or the calcining duration is shortened. The respective proportion of the modifications can be determined by x-ray spectrography; the specific surface, the pore volume and the pore distribution are determined by mercury porosimetry. The maxima of the pore diameters and the median pore diameter may be determined from the above.

If desired, the aluminum oxide may be pretempered before the calcining, for example, up to several hours. Thus, pretempering may take place for 2 to 6 hours at temperatures between 550° and 650° C.

An advantage of the build-up granulation process is the fact that the aluminum oxide can be rolled to form particles of very variable diameters. Thus, the diameter may, for example, be from 0.1 to 20 mm. Preferably, spherical particles are rolled which have a diameter of from 0.1 to 1.0 mm, particularly from 0.3 to 0.8 mm. In this method, the particle size spectrum has a very small range of variation, the largest and the smallest particles do not vary in their diameters by more than 0.2 mm. Naturally, in the course of the production process, the particles may also be divided into special fractions, for example, by means of sieving.

The transformation of the calcined carriers into the carrier catalysts according to the invention may take place in a known manner. For example, salts or complex compounds of palladium, rhodium or of the element of the copper group may be applied to the carrier material by immersion, by spraying or by precipitation process, and after drying and subsequent calcining, may be reduced, if desired. The carrier material may be immersed or sprayed and dried, for example, with a solution or suspension of metal salts or complex metal compounds in water or an organic solvent, for example a lower alcohol, such as ethanol, or a ketone or a mixture thereof. After drying, they may be calcined, if desired, at temperatures of up to 600° C., for example, between 300° and 600° C. If desired, a reduction may follow by means of a reducing agent which is free of metal, preferably hydrogen or optionally also another reducing agent, such as $NaBH_4$, $LiAlH_4$, hydrazine, formaldehyde, carbon monoxide or methane with a thermal treatment at temperatures in the range of up to 550° C., for example, between approximately 100° and 550° C.

The carrier catalysts according to the invention are suitable, for example, for the removal of oxygen from water. Low-oxygen water or oxygen-free water is used, for example, for producing alcoholic or non-alcoholic beverages. Low-oxygen water also has the advantage of a lower corrosiveness and is therefore often used as cooling water.

For the reduction of the oxygen, the water which contains oxygen is mixed with elemental hydrogen gas, preferably at standard pressure or superatmospheric pressure, and is then conducted through a carrier catalyst according to the invention. Spherical carrier catalysts are particularly suitable because the process may be carried out in a fluidized bed using such catalysts.

The carrier catalyst according to the invention is suitable for removing or decreasing the nitrite and/or nitrate content of nitrite-laden and/or nitrate-laden water with selective formation of nitrogen. Here also, a spherical carrier catalyst is preferably used because then the process can be carried out particularly effectively in the fluidized bed.

Carriers and carrier catalysts are so stable that they can be used even under extreme conditions, for example, at temperatures of up to 120° C. and more and at pressures of up to $40.10^5$ Pa (40 bar) and more.

As mentioned above, it is another object of the invention to provide an improved reaction process. Based on European Patent Document EP-A-0 359 074, an improved catalytic reduction process was found which can be carried out continuously and by means of which oxygen, nitrite and/or nitrate can be removed from water with formation of non-toxic reaction products, primarily water or nitrogen and while largely avoiding the formation of ammonium ions, and which can be used particularly during the processing of nitrite- and/or nitrate-laden ground water, river water, spring water or industrial waste water, for example, in the field of producing water for the food or beverage industry or of drinking water and for the removal of nitrite and/or nitrate from beverages, such as mineral water or fruit juice or from water intended for the production of beverages, such as mineral water, fruit juice or alcoholic beverages, as well as for the removal of oxygen from the above-mentioned types of water. In these cases, the above-described catalysts or the catalyst system were used.

An object of the invention is a process for the removal or reduction of the oxygen content, of the nitrite content and/or nitrate content of oxygen-containing and/or nitrite-laden and/or nitrate-laden water which can be carried out continuously and with the selective formation of nitrogen, in which case hydrogen gas is introduced into the oxygen-containing, nitrite-laden and/or nitrate-laden water, and the water laden with hydrogen is contacted by a catalyst which is formed from a porous carrier which is impregnated with a metal component composed of palladium and/or rhodium or of palladium and a metal of the copper group, in which case the carrier is composed of aluminum oxide of the "theta" and "kappa" modifications and the "alpha" modification is not present or is present in a proportion of less than 10% by weight, relative to the weight of the carrier, and the carrier is free of aluminum oxide of the "gamma" and "delta" modifications, and has either a monomodal distribution of the pore diameters with a maximum in the range of between 70 and 150 mn (700 Å and 1,500 Å), or has a bimodal distribution of the pore diameters with two maxima in the range of from 10 to 150 nm (100 to 1,500 Å), the median pore diameter being between 30 and 50 nm (300 and 500 Å), and for the treatment of only nitrite-laden water, a catalyst is used whose metal component is palladium and/or rhodium and, if the water to be treated also contains nitrate, a catalyst is used whose metal component comprises palladium and a metal of the copper group, rhodium and optionally palladium, or a mixture of a catalyst whose metal component comprises palladium and a metal of the copper group, and a catalyst whose metal component comprises only palladium, and in this case the pH-value of the water is not allowed to rise above pH 8, and the process is optionally carried out so many times successively until the oxygen content, the nitrite content and/or the nitrate content of the water is removed or is decreased to an acceptable value.

Preferred embodiments of the process are carried out by means of the above-described preferred catalysts according to the invention. Thus, the maximum amount of "alpha" modification present in the carrier should be 10% by weight.

The process according to the invention is therefore even more effective than the process known from European Patent Document EP-A-0 359 074 because, while the selectivity is high, the special aluminum oxide carrier catalyst is very resistant to abrasion and has a longer service life. Additional advantages are connected with the implementation in the fluidized bed and will be described below.

Within the scope of the present invention oxygen-containing and nitrite-laden or nitrate-laden water and aqueous solutions of any origin may be treated if they are free of substances which are known to act as poisons for catalysts containing palladium, rhodium or metals of the copper group or which can attack the carrier material. In the present application, the term "water" refers to water and aqueous solutions of this type. If the water to be purified contains other substances which are reducible under the reaction conditions of the process according to the invention, these are also reduced. If it seems desirable, such reducible other substances are removed beforehand from the water to be purified.

The nitrite content and/or nitrate content as well as the oxygen content, which can be removed by means of the process according to the invention or can be decreased to an acceptable, may vary within a wide range. Thus, by means of the process according to the invention, water can be treated which has a nitrate and/or nitrate load of between 0.1 mg/l and several grams per liter. In particular, the present process is suitable for removing the nitrite and/or nitrate content from water with a low nitrite and/or nitrate load, for example, in the range of from 0.1 to 20 mg/l nitrite and/or approximately 5 to 600 mg/l nitrate.

It is apparent to a person skilled in the art that the process according to the invention can be used for the removal of oxygen from water containing neither nitrite nor nitrate. The process may naturally also be used for the removal of nitrite and/or nitrate from water containing no oxygen. Finally, according to another variant, the process may also be used for the removal of nitrite and/or nitrate from water which at the same time contains oxygen. In this case, in addition to nitrite and/or nitrate, the oxygen is also removed.

In particular, the process according to the invention is used for the treatment of water which, with respect to its percentage of purity, corresponds to a water which has passed through a natural filtration. Such water may contain water-soluble substances, such as inorganic salts in amounts found in the ground water, thus, for example, up to several grams per liter. Examples of water to be treated by means of the process according to the invention are ground water, well water, spring water or shore filtrates or other waste water which has already been correspondingly precleaned, such as industrial waste water, for example from flue gas washers, in which the content of oxygen, nitrite and/or nitrate may be decreased. Other examples of types of water to be treated by means of the process according to the invention are beverages, such as mineral water, soft drinks and fruit juices as well as water which is to be used for producing beverages, such as mineral water, soft drinks, fruit juices or alcoholic beverages, for example, for producing beer.

The process is suitable, for example, for use in the processing of drinking water as well as the processing of water or waste water for the food or beverage industry as well as for other purposes where water which contains only a low content of, or is free of, oxygen, nitrite and/or nitrate is required.

If the water contains only nitrite and possibly oxygen, a carrier catalyst according to the invention may be used whose metal component is composed of palladium and/or rhodium. If the water to be treated also contains nitrate, a carrier catalyst according to the invention is used whose metal component is composed of palladium and a metal of the copper group or of rhodium and optionally palladium. If the water to be treated also contains nitrate, the catalyst system according to the invention may also be used, preferably the catalyst system of catalyst particles containing only palladium as the metal component and carrier catalyst particles containing palladium and a metal of the copper group, particularly copper as the metal component. The weight ratio of palladium-containing to palladium/copper-containing catalyst particles may vary depending on the nitrate and nitrite content of the water and the amount and composition of the metal components of the catalysts and may be between 1:5 and 5:1, preferably between 1:2 and 2:1. Advantageously, the different particles are present separately from one another. The water to be treated is then first guided through the palladium/copper group metal-containing particles and then through the particles containing only palladium, preferably in each case in a fluidized bed.

The diffusion in the aqueous medium must take place sufficiently rapidly. This is an important prerequisite for avoiding the formation of ammonium. This prerequisite is met by the carrier catalysts to be used in the process according to the invention which are composed of the indicated "theta" and "kappa" aluminum oxide modifications and have the indicated distribution of pore diameters. Catalysts having a carrier which has a monomodal distribution of pore diameters with a maximum in the range between 80 and 125 nm (800 Å and 1,250 Å), particularly between 80 and 105 nm (800 Å and 1,050 Å), are particularly advantageous.

The surface of the carriers of the above-described structure is preferably in the range of approximately 41 to 50 m$^2$/g. The pore volume is advantageously between 0.35 ml/g and 0.60 ml/g. The weight ratio of the "theta" and "kappa" modifications is preferably between 30:70 and 10:90.

In the process according to the invention, spherical carrier catalysts are preferably used because they are particularly suitable for a fluidized-bed process. However, other forms may also be used, such as carrier catalysts in the form of cylinders, hollow cylinders, hollow spheres, pressed parts, extruded parts, etc. Naturally, carriers in monolithic form may also be used. For the particularly preferred embodiment of the process according to the invention as a fluidized-bed, suspension or fixed-bed reaction, spherical carrier catalysts having a particle size of at least 0.1 mm, for example, 0.1 mm to 20 mm are used. Catalyst particles having a diameter of from 0.1 to 1 mm, preferably 0.3 to 0.8 mm, were found to be particularly suitable for carrying out the invention as a fluidized-bed process.

In the treatment of nitrite-containing and/or nitrate-containing water according to the invention, an amount of hydroxyl ions is set free which is equivalent to the amount of reduced nitrites and/or nitrates. This results in a rise of the pH-value of the treated water which is a function of the amount of the nitrite and nitrate to be reduced and of the hydrogen available for the reduction. Advantageously, the pH-value of the water is regulated such that the reaction-caused rise does not lead to values above pH 8. The adjustment of the pH-value may take place, for example, by addition of an aqueous solution of an acid, preferably of a diluted inorganic acid, such as hydrochloric acid or $CO_2$.

If desired, the introduction of the hydrogen gas into the water and a possibly required pH-adjustment may take place while the water is in contact with the catalyst. However, expediently, the hydrogen gas is charged into the water in a separate gasification tank before it comes in contact with the catalyst. If desired, the pH-value of the water to be treated may be adjusted in this case in such a manner that the subsequent pH-rise remains within the desired range.

The pH-value of the water to be treated should be in a range of approximately 2 to 8, particularly 4 to 8.

Normally, water whose nitrite and/or nitrate content is to be reduced by means of the process according to the invention also contains dissolved oxygen. Therefore, for complete removal of the nitrite and/or nitrate content of the water, a total amount of hydrogen gas is required which corresponds at least to the amount which is stoichiometrically required for reducing the oxygen content and the nitrite and/or nitrate content of the water. Thus, for the reduction of 100 mg nitrate, theoretically approximately 9 mg hydrogen are required; for the removal of 8 mg oxygen, approximately 1 mg hydrogen. If the water to be treated contains only low mounts of nitrite and/or nitrate, it has been found advantageous to introduce an amount of hydrogen which corresponds at least to the stoichiometrically calculated amount and to no more than a 20% excess of this calculated amount.

The gasification of the water with hydrogen preferably takes place in the manner of a permeation gasification. In this case, the charging of gas into the water takes place via a fixed membrane, such as a silicone caoutchouc membrane. Membranes having an integrally asymmetrical construction and particularly composite membranes are particularly suitable. These membranes comprise a porous water-resistant support structure and at least one layer made of water-resistant, non-porous polymer past which the liquid to be gasified is guided. This non-porous layer, for example, made of silicone polymer, is very thin; it may, for example, have a thickness of from 0.5 to 10 micrometers. Such membranes are described in European Patent Document EP-A 291 679 (U.S. Pat. No. 4,933,085). Other methods, for example, via gas saturators, are also suitable for the introduction of $H_2$.

The process according to the invention may operate at standard pressure or a slight excess pressure, for example, of up to 10 atmospheres or more. The solubility of the hydrogen gas in the water at standard pressure and at temperatures between 10 and 25° C., is below 2 mg/l and is also doubled in each case when the pressure is doubled. In cases where larger amounts of hydrogen are required for reducing correspondingly high amounts of nitrite and/or nitrate, it is therefore recommended that the gasification be carried out under pressure. When water is treated which contains only oxygen, it is possible to work very well at ambient pressure.

The contact time between the catalyst and the water to be treated should expediently not significantly exceed the required time period which is necessary for converting nitrite and/or nitrate to nitrogen. Longer contact periods may possibly promote reduction of the resulting nitrogen beyond the zero stage to ammonium. Optionally, several manual tests may be carried out.

Preferably, the process according to the invention is carried out as a fluidized bed, suspension bed or moving bed. This embodiment is preferred because, surprisingly, bacterial contamination of the catalyst particles with a possible reduction of the catalytic activity does not take place. It is therefore not necessary, even though it is naturally also possible, to carry out a decontamination, for example, by means of UV-light or other measures.

In the case of a high content of oxygen, nitrite or nitrate, if necessary, the process according to the invention may be carried out several times in succession until a sufficient reduction, for example to values which are acceptable for drinking water, or complete removal is achieved. In this case, a portion of the already treated water can be recycled to the reactor or several reaction units are provided which have a gasification tank and a reactor. Via the used amount of hydrogen and the multiple treatment of the water, any arbitrary residual concentration of the original content of oxygen or nitrite or nitrate in the treated water can be adjusted.

The temperature during the treatment may be between 5° C. and 95° C., preferably between 10° C. and 25° C.

The nitrite and/or nitrate decomposition performance may vary depending on the starting concentration of nitrite and/or nitrate, the pH-value, the hydrogen gas concentration or gasification rate and the temperature. For example, with a palladium catalyst containing 2% by weight palladium and having a pore diameter distribution with a maximum at 85 nm (850 Å), nitrite decomposition performance of more than 20 mg nitrite per hour and gram catalyst may be achieved. With a catalyst doped with palladium and copper containing 2% by weight palladium and 0.5% by weight copper on aluminum oxide having a pore diameter distribution with a maximum at 85 nm (850 Å), nitrate decomposition rates, for example, of 15 mg nitrate and more per hour and gram of catalyst can be achieved.

If desired, before the treatment, the water may be passed through a disinfecting apparatus, such as a UV-flow lamp, for decontamination. However, this is not necessary in the case of the advantageous operation in a fluidized bed.

A fixed-bed process which can be carried out continuously and an apparatus which can be used for this purpose are described in European Patent Document EP-A-0 359 074. The water is first conducted to a metering tank in which the pH-value can be measured; then through a disinfecting apparatus; finally via a pump through one or more reaction units consisting of a hydrogen gasification tank and a fixed-bed reactor. The system may comprise additional measuring devices, such as flowmeters, pressure gauges, pH-meters, thermometers. The treated water may then also be subjected to a pH-value adjustment.

The apparatus described in the following is particularly well suited for carrying out the process according to the invention in a fluidized bed or suspension bed. It comprises a pressure increasing apparatus with a fluid inlet and outlet in which the untreated water can be acted upon by pressure. The pressure increasing apparatus is connected with a hydrogen charging device which has a hydrogen inlet. Connected to the hydrogen charging device is a fluidized-bed, suspension bed or moving bed reactor which comprises the above-described special aluminum oxide carrier catalyst. This reactor also has a fluid inlet and fluid outlet for the water. The above-described parts of the apparatus are connected by pipes for transporting the water. Preferably, the system has two filtering devices which are arranged in front of the pressure increasing apparatus and behind the reactor. The system may also comprise an additional metering tank, pH-meter and regulating device, which is arranged in front of and/or behind the pressure increasing apparatus. If desired, measuring points, such as pressure gauges, flow meters and/or thermometers, for determining analytical data of the water may be mounted in the pipes or the parts of the apparatus.

A disinfecting apparatus may be provided. Preferably, the apparatus comprises no disinfecting apparatus.

The gasification unit preferably comprises a permeation membrane for the introduction of hydrogen, for example a silicone tube. Permeation membranes are also very suitable which comprise a support structure formed of porous water-resistant polymer and at least one layer of water-resistant non-porous polymer, in which case the water to be treated is in contact with the membrane on the side of the layer of water-resistant non-porous polymer. For example, integrally asymmetrical membranes made, for example, of polyethamide, are very suitable. Particularly suitable are membranes which, in addition, are coated with water-resistant, hydrophobic non-porous polymer, preferably silicone polymer. Such membranes are known as composite membranes. The gasification unit may be constructed, for example, as a hollow-filament module. Such a hollow filament module comprises a large number, for example, dozens or hundreds of hollow filaments. For example, 100 to 500 hollow filaments may be combined in the form of composite membranes in a hollow-filament module. The hollow filaments are connected via a distributor to the supply line for the water to be treated and via a collector with the discharge line for the gasified water. The water is conducted through the hollow filaments. The module, which can be sealed off in a pressure-tight manner, also has a supply line for the hydrogen gas which is forced into the space surrounding the hollow filaments and then diffuses through the wall of the hollow filaments and into the water to be gasified where it is introduced without forming bubbles.

The process according to the invention has several surprising advantages. Because of the high selectivity of the carrier catalysts to be used, no by-products are produced which adversely affect the environment; because of the high mechanical stability and abrasion-resistance of these catalysts, the process according to the invention can be described for a long time without loss of catalyst activity and without the necessity of exchanging the catalyst. It is particularly advantageous, both economically and from a sanitary point of view, to carry out the process according to the invention using a spherical carrier catalyst in a fluidized bed. It is completely surprising that bacterial contamination of the catalyst, which could impair its catalytic activity and also is undesirable from a sanitary point of view, is effectively suppressed without any additional disinfecting treatment.

BRIEF DESCRIPTION OF THE DRAWINGS

FIGS. 2 to 8 reproduce the distribution of the pore diameters of the carriers of Examples 1 to 7.

Figure 1:
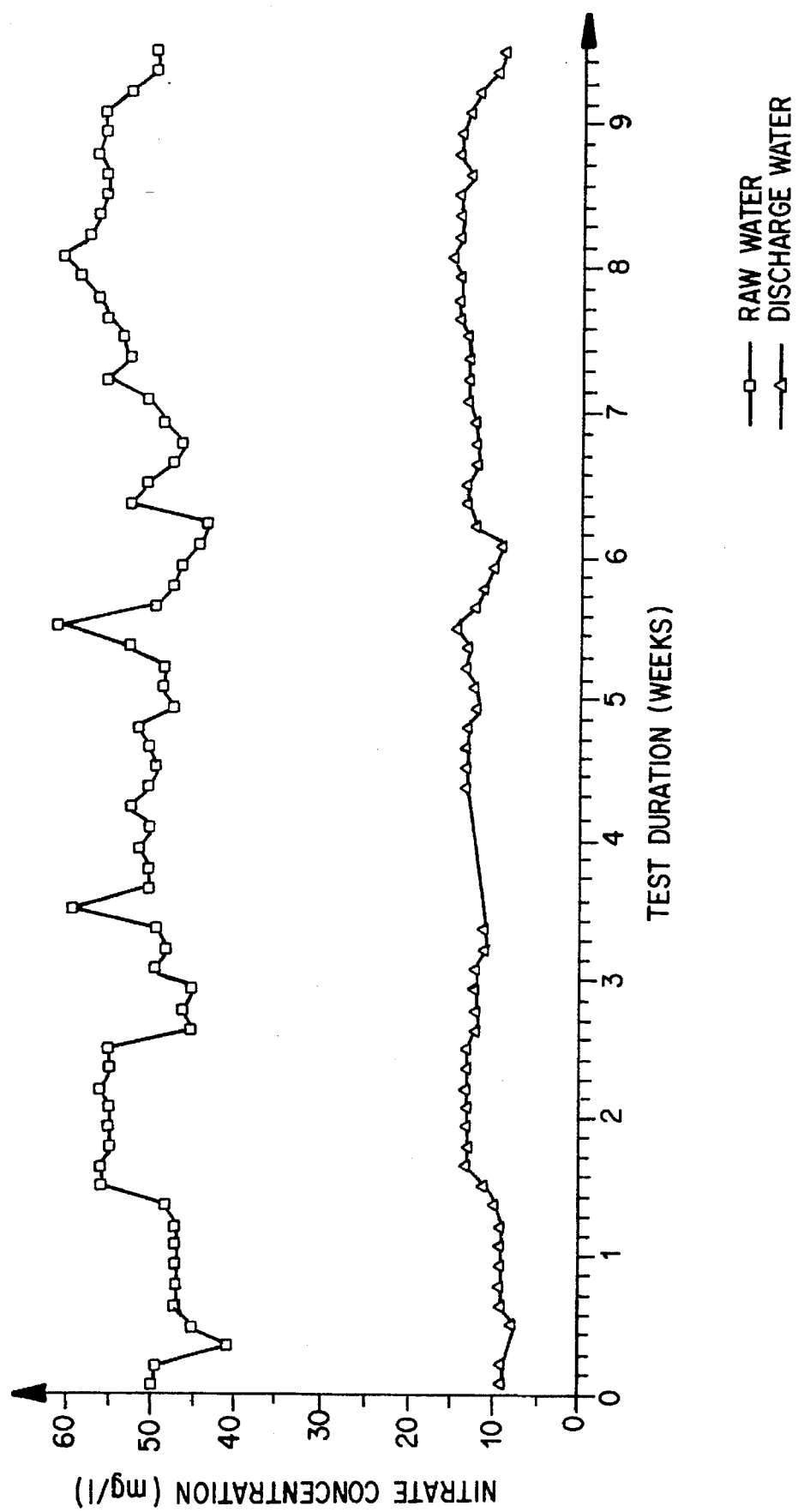
FIG. 1 is a graphic representation of the nitrate decomposition performance of an Example catalyst.

The invention will be explained with the aid of the following examples without limiting its scope.

EXAMPLES

General:

The catalyst carrier, whose production will be described in the following examples, was subjected to a test, in which the relative abrasion resistance of several carriers could be compared with one another. This determination of the relative abrasion resistance was carried out as follows: 1.0 g respectively of the material to be tested were weighed into a 10 ml snap cover glass (45×22 mm) and were rinsed twice with 5 ml deionized water (VE-water) in order to remove possibly adhering dust. The water adhering to the surface was drawn off by means of a capillary tube so that only the water situated in the pores remained in the material. Then 5 ml VE-water were added again and the closed glass was shaken for 1 minute on a test glass shaker (Firm Heidolf, Reax 1R) at 2,400 revolutions per minute. 2 ml of the supernatant solution were then immediately transferred to a 10 mm vessel and the extinction value E was measured several times after a repeated shaking at λ=500 μm (CADAS 100 Spectrophotometer, firm Dr. Lange). At E-values which are greater than 1, the sample must be diluted correspondingly, in which case there is linearity of the measured values.

Under these test conditions, mechanically stable and therefore abrasion-resistant carriers or catalysts have E-values in the range of from 0.1 to 0.7.

EXAMPLES 1 TO 7: PRODUCTION OF THE CARRIER MATERIAL

EXAMPLE 1

Production of Aluminum Oxide Carriers with a Monomodal Pore Distribution, Maximum of the Pore Diameter at 85 nm (850 Å)

The build-up granulation method was used. 140 kg nucleation agents (undersize particles from an earlier build-up granulation with 70% by weight aluminum oxide and 30% by weight of water, particle size smaller than 0.5 mm) were sprayed with 3 l water.

Subsequently, 105 kg of an aluminum oxide mixture were produced in that amorphous, highly dispersed alumina (Commercial Product HLS® of the firm Martinswerk, Bergheim) and aluminum oxide of the boehmite type (commercial product Condea Pural SB® of the firm Condea, Brunsbuettel) were mixed with one another at a weight ratio of 40:12.5. Together with the 140 g of nucleation agent, this aluminum oxide mixture was charged into a rotary table. Over the course of 4 hours, approximately 32.6 kg water were sprayed onto the rotating mass.

Then another 132 g of the above-described aluminum oxide mixture at the indicated weight ratio of amorphous aluminum oxide and aluminum oxide of the boehmite type were added to the mass situated in the rotary table. Over the course of 2.5 hours, another 42 kg water were sprayed onto the rotating mass. Then the mass was rolled for another 20 minutes and was aged for 16 hours in the idle rotary table.

With the metered addition of 3 kg water, the aged mass was rolled again for 15 minutes in the rotary table and was then sieved off. Undersize particles (particle diameter smaller than 0.5 mm) and oversize particles (particle diameter larger than 0.68 mm) after being crushed were recycled as nucleation agents into a later build-up granulation.

The fraction with a particle size of from 0.5 to 0.68 mm was then dried for 16 hours at 150° C.

Yield: 188 kg dried material composed of 85% by weight aluminum oxide, balance water.

10 kg material were then removed from the predried material, which were first predried for 4 hours at 600° C. and then calcined for 5 hours at 1,050° C.

Yield: 8.5 kg spherical aluminum oxide, composed of "theta" and "kappa" modifications with traces of the "alpha" modification. The material was free of the "gamma" and "delta" modifications.

Maximum of the Pore Diameter: 85 nm (850 Å). The diameters of the pores are distributed over the range between 6 nm (60 Å) and 180 nm (1,800 Å).

Relative abrasion number: 0.63

Specific surface measured according to the mercury porosimetry method: 45 m$^2$/g, Pore volume: 0.40 ml/g Median pore diameter: 35.6 nm (356 Å).

EXAMPLE 2

Production of a Monomodal Carrier With a Maximum of the Pore Diameter at 95 nm (950 Å).

10 kg of the starting material produced according to Example 1 were first predried for 4 hours at 600° C. and then calcined for 6 hours at 1,050° C.

Yield: 8.5 kg spherical aluminum oxide. It consisted of the "theta" and "kappa" modifications; the "alpha" modification could be detected only in traces.

Maximum of the Pore Diameter: 95 nm (950 Å). The diameters of the pores are distributed over the range between 8 and 180 nm (80 Å and 1,800 Å).

Relative abrasion number: 0.64

Specific surface: 35 m$^2$/g,

Pore volume: 0.39 ml/g

Median pore diameter: 44.6 nm (446 Å).

EXAMPLE 3

Production of a Monomodal Carrier With a Maximum of the Pore Diameter at 85 nm (850 Å).

Example 1 was repeated. Instead of the aluminum oxide of the Pural SB® trade name, the commercial product Pural NF® (also a boehmite) of the firm Condea-Chemie was used as the aluminum oxide.

10 kg of the dried material produced analogously to Example 1 were used as the starting material. Again, the material was first predried for 4 hours at 600° C. and then calcined for 5 hours at 1,050° C.

Yield: 8.5 kg spherical aluminum oxide. It consisted of the "theta" and "kappa" modifications; the "alpha" modification could be detected only in traces.

Maximum of the Pore Diameter: 85 nm (850 Å). The diameters of the pores are distributed over the range between 8 and 140 nm (80 Å and 1,400 Å).

Relative abrasion number: 0.44

Specific surface: 46 m$^2$/g,

Pore volume: 0.39 ml/g

Median pore diameter: 33.9 nm (339 Å).

EXAMPLE 4

Production of a Monomodal Carrier With a Maximum of the Pore Diameter at 1,000 Å.

10 kg of the starting material produced in Example 3 were first predried for 4 hours at 600° C. and then calcined for 6 hours at 1,050° C.

Yield: 8.5 kg spherical aluminum oxide. It consisted of the "theta" and "kappa" modifications; the "alpha" modification could be detected only in traces.

Maximum of the Pore Diameter: 100 nm (1,000 Å). The diameter of the pores is distributed over the range between 10 and 180 nm (100 Å and 1,800 Å).

Relative abrasion number: 0.69

Specific surface: 33 m$^2$/g,

Pore volume: 0.42 ml/g

Median pore diameter: 50.9 nm (509 Å).

EXAMPLE 5

Production of a Bimodal Carrier With Maxima of the Pore Diameter at 11.5 and 140 nm (115 and 1,400 Å).

First, starting material was produced analogously to Example 1. Instead of the aluminum oxide PURAL SB®, CATAPAL B® of the firm Vista Chemical Company was used.

10 kg of the dried material produced analogously to Example 1 as the starting material were first predried for 4 hours at 600° C. and then calcined for 5 hours at 1,050° C.

Yield: 8.5 kg spherical aluminum oxide. It consisted of the "theta" and "kappa" modifications; the "alpha" modification could be detected only in traces.

Maxima of the Pore Diameters: 15 and 140 nm (150 Å and 1,400 Å). The diameters of the pores were distributed over a range between 8 and 400 nm (80 Å and 4,000 Å).

Relative abrasion number: 0.50

Specific surface: 41 m$^2$/g,

Pore volume: 0.46 ml/g

Median pore diameter: 44.9 nm (449 Å).

EXAMPLE 6: (COMPARATIVE EXAMPLE)

10 kg of the starting material produced according to Example 1 were first predried for 4 hours at 600° C. and then calcined for 2 hours at 900° C.

Yield: 8.5 kg spherical aluminum oxide. It consisted of the "delta" and "kappa" modifications; the "gamma" modification could be detected in small amounts.

Maximum of the Pore Diameter: 22 nm (220 Å).

Relative abrasion number: 1.03

EXAMPLE 7: (COMPARATIVE EXAMPLE)

10 kg of the starting material produced according to Example 1 were first predried for 4 hours at 600° C. and then calcined for 4 hours at 1,100° C.

Yield: 8.5 kg spherical aluminum oxide. It consisted of the "alpha" modification; the "theta" and "kappa" modifications could be detected in small amounts.

Maxima of the Pore Diameters: 126 nm and 11,000 nm (1,260 Å and 110,000 Å).

Relative abrasion number: 1.9

FIGS. 2 to 8 reproduce the distribution of the pore diameters of the carriers of Examples 1 to 7.

It can be seen from Examples 1 to 7 that the relative abrasion number as a measure of the abrasion resistance will have satisfactory values (i.e., will be below 0.7) if care is taken during calcination that the "delta" modification does not arise and the "alpha" modification arises in the carrier at most in undesired small proportions.

EXAMPLES 8 TO 15: PRODUCTION OF CARRIER CATALYST

EXAMPLE 8

Production of a Carrier Catalyst Containing Pd and Cu With a Maximum of the Pore Diameter at 85 nm (850 Angstrom).

The carrier material produced according to Example 1 was used. A fraction was used, which has been found to be particularly advantageous, having a particle size range of from 400 to 680 micrometers and proportions of oversize and undersize particles each less than 3%. The particle size distribution within the range from 400 to 680 micrometers followed the normal distribution.

The catalysts were produced by applying the catalytically active metal compounds to the carrier material, in which case one of the following methods was used.

a) In a 250 ml round flask, 30 g of the carrier material of the above-mentioned fraction produced according to Example 1 were introduced into 219 ml of an aqueous tetraammonium palladium(II) hydroxide solution with a palladium content of 2.74 g/l, i.e., a total palladium content of 0.6 g. During a time period of 2 hours, the solution was concentrated to dryness at 60° and 30 mbar; the resulting impregnated carrier was dried for 1 hour at 110° C., and the dried carrier was calcined for 0.5 hours at 550° C.

The application of copper took place under analogous conditions. To produce the copper salt solution, 0.47 g copper(II) acetate monohydrate (corresponding to 0.15 g copper) were dissolved in 100 ml deionized water. The impregnated carrier was then dried for 2 hours at 110° C. In order to reduce the metals, the impregnated and dried carrier was subjected to a hydrogen atmosphere for 8 hours at 350° C. in an externally heated quartz tube.

As analyzed, the finished catalyst had a palladium content of 2.0±0.05% by weight and a copper content of 0.5±0.02% by weight. The relative abrasion number corresponded to the abrasion number of the carrier material.

b) 50.42 g of the carrier material of the above-mentioned fraction produced according to Example 1 were introduced into a solution of 1.68 g palladium dichloride, which corresponds to 1.0 g palladium, in 11.75 ml 1-molar hydrochloric acid and 22.7 ml acetone in a 250 ml round flask. The solution was stirred for 30 minutes while connected to a rotary evaporator. The solvents were evaporated during a period of 60 minutes at 60° C. and 50 mbar. The carrier impregnated with palladium was then dried for 1 hour at 150° C. and was calcined for 0.5 hours at 550° C. To apply the copper, the palladium-impregnated carrier was introduced into a solution of 0.79 copper(II) acetate monohydrate, which corresponds to 0.25 g copper, in 30 ml water, and treated as described above in the rotary evaporator. The carrier impregnated with palladium and copper was then dried for 1 hour at 100° C. and was finally reduced as described in a).

The analysis corresponded to the values obtained according to method a).

EXAMPLE 9

Production of a Carrier Catalyst Containing Only Palladium with a Maximum of the Pore Diameter at 85 nm (850 Angstrom).

Analogously to Example 8, the carrier obtained according to Example 1 was impregnated with palladium. The palladiumimpregnated carrier was dried for 1 hour at 110° C., calcined at 550° C., and reduced with hydrogen.

The finished catalyst had a palladium content of from 2.0±0.05% by weight. The relative abrasion number, the distribution of the pore diameter, the specific surface, the pore volume and the median pore diameter corresponded to the values of the carrier material.

EXAMPLE 10

Production of a Carrier Catalyst Containing Palladium and Copper with a Maximum of the Pore Diameter at 95 nm (950 Å).

Example 8 was repeated analogously. However, this time the carrier material was used which was produced in Example 2. The resulting carrier catalyst had a palladium content of 2.0±0.05% by weight palladium and 0.5±0.02% by weight copper. The abrasion number, the distribution of the pore diameter, the specific surface, the pore volume and the median pore diameter corresponded to the values of the carrier material.

EXAMPLE 11

Production of a Carrier Catalyst Containing Palladium and Copper with a Maximum of the Pore Diameter at 85 nm (850 Å).

Example 8 was reworked analogously. However, this time the carrier material produced in Example 3 was used. The palladium content was 2.0±0.05% by weight palladium, the copper content was 0.5±0.02% by weight copper. The abrasion number, the distribution of the pore diameters, the specific surface, the pore volume and the median pore diameter corresponded to the values of the carrier material which was used.

EXAMPLE 12

Production of a Carrier Catalyst Containing Palladium and Copper with a Maximum of the Pore Diameter at 100 nm (1,000 Å).

Example 8 was reworked analogously; however, this time the carrier material produced in Example 4 was used. The resulting carrier catalyst had a palladium content of 2.0±0.05% by weight and a copper content of 0.5±0.02% by weight. The abrasion number, the distribution of the pore diameters, the specific surface, the pore volume and the median pore diameter corresponded to the values of the carrier material which was used.

EXAMPLE 13

Production of a Bimodal Carrier Catalyst Containing Palladium and Copper with Maxima of the Pore Diameters at 11.5 and 140 nm (115 and 1,400 Å).

Example 8 was reworked analogously; however, this time the carrier material produced in Example 5 was used. The resulting carrier catalyst had a palladium content of 2.0±0.05% by weight and a copper content of 0.5±0.02% by weight. The abrasion number, the distribution of the pore diameters, the specific surface, the pore volume and the median pore diameter corresponded to the values of the carrier material which was used.

EXAMPLE 14: (COMPARATIVE EXAMPLE)

Production of a Carrier Catalyst With a Maximum of the Pore Diameter at 22 nm (220 Å).

Example 8 was reworked analogously. This time the carrier material produced according to Example 6 was used. The finished carrier catalyst contained 2.0±0.05% by weight palladium and 0.5±0.02% by weight copper. The abrasion number, the distribution of the pore diameters, the specific surface, the pore volume and the median pore diameter corresponded to the values of the carrier material which was used.

EXAMPLE 15: (COMPARATIVE EXAMPLE)

Example 8 was reworked analogously. This time the carrier material produced according to Example 7 was used. The finished carrier catalyst contained 2.0±0.05% by weight palladium and of 0.5±0.02% by weight copper. The abrasion number, the distribution of the pore diameters, the specific surface, the pore volume and the median pore diameter corresponded to the values of the carrier material which was used.

EXAMPLE 16

Use of the carrier catalyst containing palladium and copper produced according to Example 8, for removing oxygen and nitrate from water in a fluidized bed.

Apparatus Used:

An untreated water line led first into a mechanical filter and then into a pressure increasing device. From the pressure increasing device, a line led into a gasification reactor. In this gasification reactor, hydrogen could be charged through silicone membranes into the water. The gasification reactor was connected with a reactor in which the catalytic oxygen and nitrate decomposition was carried out. 22 kg of the palladium- and copper-containing carrier catalyst produced according to Example 8 using the carrier material of Example 1, were contained in this reactor. A discharge line for the treated water, which leads out of the reactor, led into a mechanical filter. The water leaving the mechanical filter could then be supplied as clean water to the respective usage.

Test Procedure:

The test was carried out over a period of more than 9 weeks in a waterworks facility in Lower Saxony. The nitrate content of the untreated water (ground water) fluctuated between 40 mg and 60 mg per liter. The oxygen content amounted to 4.2 mg/l. The temperature of the untreated water amounted to 11° C.

The raw water was initially guided through the mechanical filter and then brought to a water pressure of $5.10^5$ Pa (5 bar) in the pressure increasing device. In the gasification reactor, the water was gasified with hydrogen. The hydrogen-laden water was conducted at a flow rate of 2,000 l per hour through the reactor in which the carrier catalyst material was held in a fluidized bed. Both the nitrate content of the nitrate-laden ground water to be treated and the nitrate content of the treated ground water were recorded over the period of more than 9 weeks. The nitrate concentrations of the untreated and of the treated ground water, which were determined by means of a plurality of measurements, can be seen from FIG. 1. The nitrate decomposition performance could be determined as 3.5 g nitrate per kilogram catalyst and hour. As shown in FIG. 1, the catalyst is stable for months and constantly delivers good results, even the amount of nitrate fluctuates.

Some analysis data of the untreated and treated ground water are collected in the following table.

TABLE 1

| Analysis Data of the Untreated and Treated Ground Water | | |
|---|---|---|
| Parameter | Untreated Ground Water | Treated Ground Water |
| pH-value | 7.10 | 7.65 |
| O$_2$-content | 4.2 mg/l | 20 µg |
| Nitrate | 59 mg/l | 11 mg/l |
| Nitrite | 0.1 mg/l | 0.1 mg/l |
| Chloride | 102 mg/l | 101 mg/l |
| Sulfate | 149 mg/l | 152 mg/l |
| Ammonium | 0.05 mg/l | 0.05 mg/l |
| Calcium | 172 mg/l | 175 mg/l |
| Iron | 0.05 mg/l | 0.05 mg/l |
| Manganese | 0.05 mg/l | 0.05 mg/l |

The carrier catalysts produced according to Examples 9 to 13 were also found to be stable over long periods. Their selectivity during nitrate decomposition was very good.

In contrast, the carrier catalysts produced according to comparative Examples 14 and 15 did not exhibit satisfactory characteristics either with respect to abrasion resistance or with respect to selectivity during nitrate decomposition.

EXAMPLE 17

Use of the Process of the Invention for Removing Oxygen and Nitrate from Water in a Discontinuous Stirrer Reactor.

The reaction was carried out in a discontinuously operated stirrer reactor which contained a temperature-controllable reactor holding 250 ml and having a magnetic stirrer, into which hydrogen could be introduced at the bottom through a porous synthetic resin tube with a needle valve for adjusting the hydrogen volume flow. The apparatus was also provided with a pH measuring and control unit, whose pH-measuring electrode situated in the reactor measures the deviation of the pH-value from the initial pH value occurring during the reaction and can compensate for the change in the pH value by addition of an aqueous diluted hydrochloric acid solution by means of a metering apparatus. The volume of acid added to maintain the pH value constant, which is proportional to the reacted amount of nitrate, was recorded on a measuring recorder.

240 ml water having a nitrate content of 50 mg/l and a pH-value of 6.0, as well as 2.0 g of the carrier catalyst produced according to Example 8, were charged into the reactor. The temperature in the reactor was adjusted to 10° C., and a gasification took place with hydrogen gas at a gasification rate of 30 l/h. After 68 minutes, the nitrate was completely decomposed. The specific nitrate decomposition performance of the catalyst until complete reaction of 50 mg nitrate in 240 ml water was calculated for 1 hour and 1 g catalyst: Specific Nitrate Decomposition Performance: 5.5 mg nitrate/h×g catalyst Explanation of the Figures:

FIG. 1:

Ordinate: Nitrate concentration in (mg/l)

Abscissa: Duration of test (weeks)

Untreated Water: □

Discharge Water: △

FIGS. 2 to 8:

Ordinate: relative frequency of a pore diameter

Abscissa: median pore radius (nm) in logarithmic scale (distances between 1 and 10 nm, 10 and 100 nm, 100 and 1,000 nm, 1,000 and 10,000 nm, each equidistant).

We claim:

1. A carrier catalyst for treating water containing at least one substance selected from the group consisting of nitrite and nitrate to decrease the content of oxygen, nitrite or nitrate therein with selective formation of nitrogen, said catalyst comprising a porous inorganic carrier material impregnated with a metal component selected from the group consisting of palladium, rhodium, a combination of palladium and rhodium, and a combination of palladium and a metal of the copper group, wherein the carrier material comprises "theta" and "kappa" aluminum oxide and 0 to 10 wt-% of "alpha" aluminum oxide and is free of "gamma" and "delta" aluminum oxide, and wherein the porous carrier has a pore diameter distribution with a single maximum (monomodal pore distribution) in the range from 70 to 150 nm or with two maxima (bimodal pore distribution) in the range from 10 to 150 nm and a median pore diameter between 30 and 50 nm.

2. A carrier catalyst according to claim 1, wherein the catalyst has a specific surface of from 41 to 50 m²/g, calculated according to the mercury porosimetry method.

3. A carrier catalyst according to claim 1, wherein the catalyst is in the form of spherical beads having diameters in the range from 0.1 to 1 mm.

4. A carrier catalyst according to claim 1, wherein the metal component consists of palladium and copper in a weight ratio of from 2:1 to 8:1.

5. A carrier catalyst according to claim 4, wherein the metal component consists of palladium and copper in a weight ratio of from 3:1 to 5:1.

6. A carrier catalyst according to claim 1, wherein the metal component comprises from 0.1 to 10 wt-% of the carrier catalyst.

7. A carrier catalyst according to claim 1, wherein the carrier catalyst comprises from 0.1 to 5% by weight palladium.

8. A carrier catalyst according to claim 1, wherein the carrier material comprises "theta" and "kappa" aluminum oxide in a weight ratio of from 30:70 to 10:90.

9. A carrier catalyst according to claim 1, wherein the porous carrier material has a monomodal pore diameter distribution with a single maximum in the range from 85 to 105 nm.

10. A process for producing a carrier catalyst comprising a porous inorganic carrier material impregnated with a metal component selected from the group consisting of palladium, rhodium, a combination of palladium and rhodium, and a combination of palladium and a metal of the copper group, wherein the carrier material comprises "theta" and "kappa" aluminum oxide and 0 to 10 wt-% of "alpha" aluminum oxide and is free of "gamma" and "delta" aluminum oxide, and wherein the porous carrier has a pore diameter distribution with a single maximum (monomodal pore distribution) in the range from 70 to 150 nm or with two maxima (bimodal pore distribution) in the range from 10 to 150 nm, and a median pore diameter between 30 and 50 nm; said process comprising the steps of mixing amorphous (chi) aluminum oxide with aluminum oxide hydrate excluding beta-monohydrate at a weight ratio of 33.69:20.50 to 44.21:7.17 and added water to obtain a carrier mixture;

forming the carrier mixture to a desired shape;

calcining the carrier mixture for 4.5 to 6.5 hours at a temperature between 1,045° and 1,055° C.;

impregnating the carrier mixture with the metal component; and calcining the impregnated carrier mixture to produce said carrier catalyst.

11. A process according to claim 10, wherein the carrier mixture is formed into spherical particles having diameters in the range from 0.1 to 1.0 mm by build-up granulation.

12. A process according to claim 11, wherein undersize particles or crushed oversize particles are introduced to the build-up granulation as granulation nuclei.

13. A continuous process for treating water containing at least one substance selected from the group consisting of nitrite and nitrate in order to decrease at least one of the oxygen content, the nitrite content and the nitrate content thereof, with selective formation of nitrogen, said process comprising the steps of introducing hydrogen gas into the water;

contacting the hydrogen-containing water with an effective amount of a carrier catalyst comprising a porous inorganic carrier material impregnated with a metal component selected from the group consisting of palladium, rhodium, a combination of palladium and rhodium, and a combination of palladium and a metal of the copper group, wherein the carrier material comprises "theta" and "kappa" aluminum oxide and 0 to 10 wt-% of "alpha" aluminum oxide and is free of "gamma" and "delta" aluminum oxide, and wherein the porous carrier has a pore diameter distribution with a single maximum (monomodal pore distribution) in the range from 70 to 150 nm or with two maxima (bimodal pore distribution) in the range from 10 to 150 nm, and a median pore diameter between 30 and 50 nm; and maintaining the pH of the water at not more than pH 8.

14. A process according to claim 13, wherein the water contains only nitrite, and the metal component of the carrier catalyst consists of palladium, of rhodium or of a mixture of palladium and rhodium.

15. A process according to claim 13, wherein the water contains nitrate, and the metal component of the carrier catalyst consists of a mixture of palladium and a metal of the copper group, of rhodium, or of a mixture of rhodium and palladium.

16. A process according to claim 13, wherein the water is contacted with particles of a first carrier catalyst comprising a metal component which consists of a mixture of palladium and a metal of the copper group and with particles of a second carrier catalyst comprising a metal component consisting of palladium.

17. A process according to claim 13, wherein the hydrogen introducing step and the contacting step are repeated successively until the content of nitrite and nitrate is decreased to a desired level.

18. A process according to claim 13, wherein hydrogen is introduced into the water in an amount of from 1 to 1.2 times that required to completely reduce the oxygen, nitrite and nitrate contained in the water.

19. A process according to claim 13, wherein the water contains 0.1 to 20 mg/l nitrite.

20. A process according to claim 13, wherein the water contains 5 to 600 mg/l nitrate, 21. A process according to claim 13, wherein said process is carried out in a fluidized bed.

* * * * *